(12) United States Patent
McCleskey et al.

(10) Patent No.: US 6,599,962 B2
(45) Date of Patent: Jul. 29, 2003

(54) INCORPORATION OF ADDITIVES INTO POLYMERS

(75) Inventors: T. Mark McCleskey, Los Alamos, NM (US); Matthew Z. Yates, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 69 days.

(21) Appl. No.: 09/835,256

(22) Filed: Apr. 12, 2001

(65) Prior Publication Data

US 2002/0002217 A1 Jan. 3, 2002

Related U.S. Application Data

(60) Provisional application No. 60/196,671, filed on Apr. 12, 2000.

(51) Int. Cl.$^7$ .............................. C08J 3/00; C08K 3/20; C08L 33/00
(52) U.S. Cl. ...................................................... 523/330
(58) Field of Search .......................................... 523/330

(56) References Cited

U.S. PATENT DOCUMENTS

| | | | |
|---|---|---|---|
| 4,613,559 A | 9/1986 | Ober et al. | 430/137 |
| 4,820,752 A | 4/1989 | Berens et al. | 523/340 |
| 5,508,060 A | 4/1996 | Perman | 427/2.14 |

OTHER PUBLICATIONS

Otake, Katsuto, Stephen E. Webber, Petr Munk, and Keith P. Johnston, "Swelling of Polystyrene Latex Particles in Water by High–Pressure Carbon Dioxide," *Langmuir*, vol. 13, pp. 3047–3051, 1997.

West, Barry L., Sergei G. Kazarian, Michael F. Vincent, Noel H. Brantley, Charles A. Echert, "Supercritical Fluid Dyeing of PMMA Films with Azo–Dyes," *Journal of Applied Polymer Science*, vol. 69, 911–919 (1998).

Kazarian, Sergei G., Noel H. Brantley, Charles A. Eckert, "Dyeing to Be Clean: Use Supercritical Carbon Dioxide," *Chemtech*, vol. 29, No. 7, pp. 36–41, 1999.

Quadir, Murat A., Rodd Snook, Robert G. Gilbert, and Joseph M. DiSimone, "Emulsion Polymerization in a Hybrid Carbon Dioxide/Aqueous Medium," *Macromolecules*, vol. 30, pp. 6015–6023, 1997.

da Rocha, Sandro R. P., Kristi L. Harrison, and Keith P. Johnston, "Effect of Surfactants on the Interfacial Tension and Emulsion Formation between Water and Carbon Dioxide," *Langmuir*, vol. 15, pp. 419–428, 1999.

Winnik, Francois and Christopher K. Ober, "Coloured Particles by Dispersion Polymerization," *Eur. Polym. J.*, vol. 23, No. 8, pp. 617–622, 1987.

Paine, Anthony James, Wayne Luymes, and James McNulty, "Dispersion Polymerization of Styrene in Polar Solvents," *Macromolocules*, vol. 23, pp. 3104–3109, 1990.

Cooper, A. I., J. D. Londono, G. Wignall, J. B. McClain, E. T. Samulski, J. S. Lin, A. Dobrynin, M. Rubinstein, A. L. C. Burke, J. M. J.d Frechets, and J. M. DiSimone, "Extraction of a Hydrophilic Compound from Water into Liquid $CO_2$ Using Dendritic Surfactants," *J. Am. Chem. Soc.*, vol. 116, pp. 7941–7942, 1994.

(List continued on next page.)

*Primary Examiner*—Patrick D. Niland
(74) *Attorney, Agent, or Firm*—Gemma Morrison Bennett; Bruce H. Cottrell

(57) ABSTRACT

There has been invented a method for incorporating additives into polymers comprising: (a) forming an aqueous or alcohol-based colloidal system of the polymer; (b) emulsifying the colloidal system with a compressed fluid; and (c) contacting the colloidal polymer with the additive in the presence of the compressed fluid. The colloidal polymer can be contacted with the additive by having the additive in the compressed fluid used for emulsification or by adding the additive to the colloidal system before or after emulsification with the compressed fluid. The invention process can be carried out either as a batch process or as a continuous on-line process.

40 Claims, 3 Drawing Sheets

OTHER PUBLICATIONS

Horak, Daniel, Svec Frantisek, and Jean M. J. Frechet, "Preparation of Colored Poly(styrene–co–butyl methacrylate) Micrometer Size Beads with Narrow Size Distribution by Dispersion Polymerization in Presence of Dyes," *Journal of Polymer Science: Part A: Polymer Chemistry*, vol. 33, pp. 2961–2968, 1995.

Zielinski, R. G., S. R. Kline, E. W. Kaler, and N. Rosov, "A Small–Angle Neutron Scattering Study of Water in Carbon Dioxide Microemulsions," *Langmuir*, vol. 13, p. 3934–3937, 1997.

Lee, C. Ted, Jr., Petros A. Psathas, Keith P. Johnston, Janet deGrazia and Theodore W. Randolph, "Water–in–Carbon Dioxide Emulsions: Formation and Stability," *Langmuir*, vol. 15, pp. 6781–6791, 1999.

Lemert, Richard M., Rob A. Fuller, and Keith P. Johnston, "Reverse Micelles in Supercritical Fluids," *J. Phys. Chem.*, vol 94, pp. 6021–6028, 1990.

INCORPORATION OF ADDITIVES INTO POLYMERS

This application claims the benefit of U.S. Provisional Application No. 60/196,671, filed Apr. 12, 2000.

This invention was made with government support under Contract No. W-7405-ENG-36 awarded by the U.S. Department of Energy. The government has certain rights in the invention.

TECHNICAL FIELD

This invention relates to a process for incorporating additives into polymers in a colliodal system by emulsifying the system with a compressed fluid.

BACKGROUND ART

There have been developed several methods for incorporating additives into polymers, including dissolving the additives in the monomers to be polymerized; introduction of the additives during polymerization; using organic solvents to transport the additives into the polymers; and contacting the polymer under pressure with a compressed fluid having the additive dissolved therein.

However, dissolving additives in monomers can adversely affect subsequent polymerization processes. Polymerization in the presence of additives can be adversely affected if the additives are reactive with the monomers or intermediates or catalysts. Also, if reactive, the additives may be changed into substances that do not serve the purpose the additives were intended to serve. Methods using organic solvents can have multiple processing steps which compromise efficiency and economy and also may require implementation of environmental precautions necessitated by use of often toxic organic solvents.

Therefore, there is still a need for methods of efficiently incorporating additives into polymers.

It is an object of this invention to provide one such method and some products thereof.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. The claims appended hereto are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a method for incorporating additives into polymers comprising: (a) forming an aqueous or alcohol-based colloidal system of the polymer; (b) emulsifying the colloidal system with a compressed fluid; and (c) contacting the colloidal polymer with the additive in the presence of the compressed fluid. The colloidal polymer can be contacted with the additive by having the additive in the compressed fluid used for emulsification or by adding the additive to the colloidal system before or after emulsification with the compressed fluid. The invention process can be carried out either as a batch process or as a continuous on-line process.

BRIEF DESCRIPTION OF THE DRAWINGS

The accompanying drawings, which are incorporated in and form a part of the specification, illustrate the embodiments of the present invention and, together with the description, serve to explain the principles of the invention.

In the drawings.

BEST MODES FOR CARRYING OUT THE INVENTION

Figure 1:
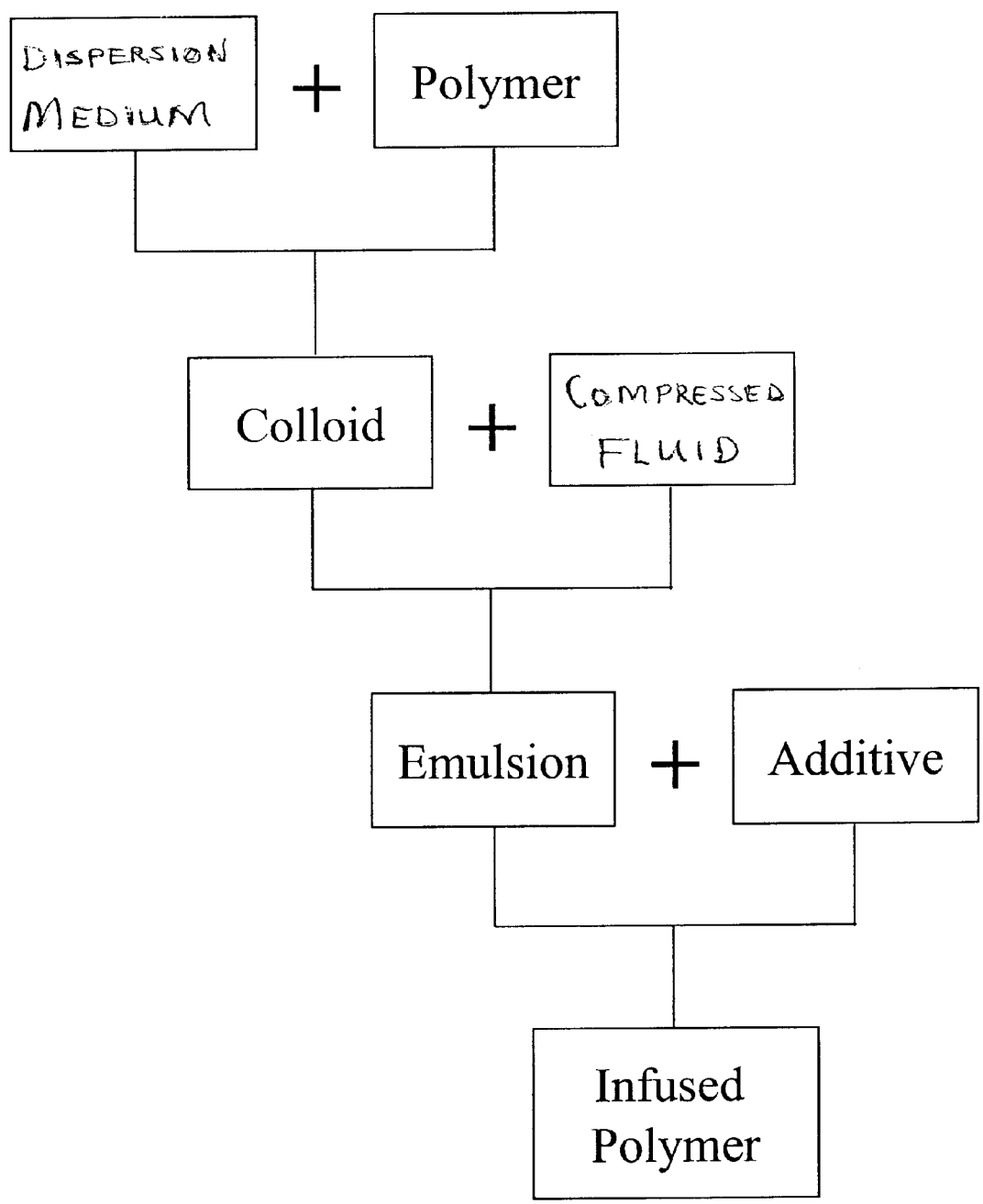
FIG. 1 is a schematic of the basic invention process.

It has been discovered that additives can be incorporated into polymers by contacting colloidal polymers in an aqueous or alcohol-based colloidal system that has been emulsified with a compressed fluid having therein the additives to be incorporated into the polymers. Alternatively, the additive can be combined with the aqueous or alcohol-based colloidal system before or after emulsification with the compressed fluid.

In a first step, the polymer to be infused with the additive is dispersed in water or alcohol to form a colloidal system. Alcohol may be preferred as the dispersion medium when it is desired to avoid acidic conditions resulting from emulsification of an aqueous colloidal system with carbon dioxide as the compressed fluid. Alternatively, buffers may be used as needed if acidity is to be reduced.

Polymers which are useful in the practice of the invention are those that can be swollen by the compressed fluid to be used. Generally, satisfactory results can be obtained if the polymer can be swollen by the compressed fluid at least 2 percent by volume and better results are obtained by use of a polymer which can be swollen by the compressed fluid at least 5 percent by volume. There is no practical upper limit to the amount of polymer volume increase which can be useful.

Generally polymers presently preferred include, but are not limited to, polystyrene, poly(lactic acid), poly(glycolic acid), poly(caprolactone), polyanhydrides, cellulose, natural rubbers, polyisoprene, styrene-butadiene polymers, butyl rubbers, chloroprene polymers, polyamides, polyimides, polyesters, nitrile rubbers, polyacrylic polymers, vinyl chloride polymers, vinylidene chloride polymers, polycarbonate polymers, polyurethane polymers, polyacrylates, polymethacrylates, polyacetylenes, and copolymers and mixtures thereof. Presently most preferred for toner particle applications is polystyrene because of the ease of control of glass transition temperature and surface charge of the particles. Presently most preferred for drug delivery applications are copolymers of lactic acid and glycolic acid because of the biodegradability of these copolymers and the extensive study of these copolymers for human drug delivery use.

If needed to stabilize the suspension of the polymers in the colloidal system, compounds or functional groups that are soluble in the aqueous or alcohol based dispersion medium of the colloidal system can be grafted or adsorbed onto the surface of the polymer into which the additive is to be incorporated. These colloidal stabilizers can be ionic groups or polymer chains that function as stabilizers of the colloidal system by helping to keep the polymer particles suspended separately in the colloidal system. Examples of colloidal stabilizers which can be grafted onto the surface of the polymer particles, copolymerized into the polymer chains, or physically adsorbed onto the surface of the polymer particles include, but are not limited to, sulfates, amines, carboxylates, and surfactants containing these ionic groups. More particular examples of colloidal stabilizers that can be grafted or adsorbed onto the polymer particles include, but are not limited to, poly(ethylene oxide), poly(N-vinyl pyrrolidone), poly(sodium 4-styrene sulfonate), poly(acrylic acid), poly(diallyldimethylammonium chloride), and copolymers and mixtures thereof.

The polymer into which the additive is to be incorporated is preferably in particulate form. Presently preferred for most applications are polymer particles in the range from about 10 nanometers to about 500 microns. The polymer particles need to be small enough to stay in suspension in the emulsified colloidal system and large enough to contain the additive and be efficiently handled. When the polymer particles are to be substrates for injectable drug delivery, polymer particles in the range from about 10 nm to about 1000 nm are generally preferred.

The polymer particle surfaces can be tailored to accomplish various purposes. For example, certain substituents such as poly(ethylene oxide) can be grafted onto the polymers or incorporated into the polymer chains to target drug delivery to particular organs in the body. Ionic substituents or polymers can be grafted onto or incorporated into the polymer chains to control electrostatic surface charge when the infused polymer is to be used as toner material for xerographic imaging.

In a second step, the aqueous or alcohol-based colloidal system is emulsified with a compressed fluid to form an emulsion. The emulsification can be carried out by subjecting the surface of the aqueous or alcohol-based colloidal system to the compressed fluid in a pressure vessel while stirring or otherwise agitating the solution, by bubbling the compressed fluid through the solution, by injecting the compressed fluid into the colloidal system, or by admixing streams of the compressed fluid and the colloidal suspension.

The compressed fluids contemplated as useful in the invention are normally gaseous fluids at atmospheric pressure and room temperature and that have a density at the processing pressure of at least 0.01 gram per cubic centimeter (g/cc), although a density of at least 0.1 g/cc is more preferred. Compressed fluid at pressures of up to 10,000 bar can be used in the invention. Generally presently preferred for incorporation of dyes into styrene polymers using compressed carbon dioxide are pressures of at least 100 bar. Generally presently preferred for incorporation of biochemically active additives into poly(lactide-co-glycolide) or poly(caprolactone) are pressures of compressed fluid of about 200 bar. The fluid can be compressed either prior to or after introduction into the colloidal system.

The compressed fluid may be in a liquid or gaseous state if the operating environment at which the process is being carried out is below or equal to the critical temperature of the fluid, or it may be in the gaseous or supercritical fluid state if the temperature of the fluid is above the critical temperature of the fluid.

The compressed fluid must be soluble to some extent in the selected polymer. Presently preferred are compressed fluids that are non-toxic and relatively chemically inactive with respect to the selected polymer. It is not necessary that the additive be soluble in the compressed fluid.

Generally presently preferred compressed fluids include, but are not limited to, carbon dioxide, ethylene, ethane, propane, nitrous oxide, monochlorotrifluoromethane, acetylene, phosphine, phosphonium chloride, methyl fluoride, methane, fluoroform, sulphur dioxide and mixtures thereof. Presently most preferred is carbon dioxide because it is relatively inexpensive, non-toxic, and readily available. Carbon dioxide plasticizes and swells many polymers, thereby facilitating mass transport of the additives within the polymer matrices.

There needs to be sufficient compressed fluid present to have adequate headspace in the reactor vessel to control the pressure and to provide sufficient compressed fluid to dissolve in the water or alcohol, and to swell a sufficient amount of the polymer to an extent necessary for incorporation of the selected additive. Use of too little compressed fluid may result in difficulty controlling the pressure needed for incorporation of the additive into the polymer or insufficient swelling of the polymer. Use of too much compressed fluid can cause a larger amount of additive necessary for adequate contact of the polymer with the additive and can be economically disadvantageous.

If needed to assist emulsification, surfactants can be used for emulsification of the compressed fluid and additives into the aqueous or alcohol-based colloidal system containing the polymer particles. The surfactant can be combined with the water or alcohol prior to addition of the polymer particles or combined with the colloidal system after addition of the polymer particles. The surfactant may also be combined with the colloidal system prior to addition of the compressed fluid, after addition of the compressed fluid, or in a mixture with the compressed fluid.

Surfactants that lower the interfacial tension between the aqueous or alcohol phase and the compressed fluid phase at the temperature and pressure used during emulsification are useful in the invention. Fluorinated or hydrocarbon based surfactants may be useful in the invention. Generally, depending upon what kind of stabilizers are grafted onto the polymers or other polymer functionality, surfactants presently preferred include, but are not limited to, sorbitan esters, sucrose esters, alkyl polyglucosides, alkyl oligosaccharides, polyoxyethylene-polypropylene block and graft copolymers, polyoxyethylene-polybutylene block and graft copolymers, perfluoropolyether ammonium carboxylate, sulfated fats and oils, sulfated monoglycerides, alkyl betaines, alkyl aminopropionates, alkyl iminodipropionates, alkyl imidazoline derivatives, alkyl pyridinium salts, alkyl trimethylammonium salts, alkyl ammonium salts, alkyl amines, alkyl phosphate salts, olefin sulfonates, alkylaryl sulfonates, sulfated alkanolamides, alkyl sulfate salts and mixtures thereof. Presently most preferred for an aqueous colloid of polystyrene with poly(N-vinyl pyrrolidone) bonded thereto for infusion with a dye is perfluoropolyether ammonium carboxylate because of its solubility in compressed carbon dioxide. For drug delivery application such as incorporation of progesterone into poly(lactide-co-glycolide) or other non-toxic biodegradable polymers, FDA approved surfactants such as polysorbate or sodium oleate are presently preferred.

An amount of surfactant sufficient to emulsify the compressed fluid and aqueous or alcohol phase is needed. An amount in the range from about 0.001 to about 10 weight percent, based on total weight of the colloidal system is generally useful in the invention. More preferable is an amount of surfactant in the range from about 0.01 to about 2 weight percent, based on total weight of the colloidal system. Generally presently preferred is an amount of surfactant in the range from about 0.1 to about 1 weight percent, based on total weight of the colloidal system. Use of too little surfactants will result in incomplete emulsification of the compressed fluid into the colloidal system. Use of too much surfactant can be an economic disadvantage causing additional waste and necessitating additional effort to remove the surfactant after incorporation of the additive into the polymer.

In a third step, the polymer in the emulsified, aqueous or alcohol-based colloidal system is contacted with the additive to be incorporated into the polymer. The additive can be added separately to the already emulsified colloidal system, can be introduced in a mixture with the compressed fluid, or can have been added to the water or alcohol before or after the polymer particles are combined with the water or alcohol used to form the colloidal system. Although the additive does not have to be soluble in the compressed fluid, both the compressed fluid and the additive must have some degree of solubility in the polymer.

The temperature at which the incorporation of the additive into the polymer is conducted is preferably below a temperature that is detrimental to either the polymer or the additive. If the incorporation is being carried out at a temperature at or below the critical temperature of the compressed fluid, the incorporation process is preferably carried out at a pressure that is at least 10% of the saturated vapor pressure of the compressed fluid at the incorporation temperature. If the incorporation is being carried out at a temperature above the critical temperature of the compressed fluid, the incorporation process is preferably carried out at a pressure 0.5 to 5 times the critical pressure of the compressed fluid.

The compressed fluid and additive is maintained in contact with the polymer in the colloidal system for a period of time sufficient to permit a desired amount of the compressed fluid and additive to become dissolved within the polymer. For most processes, this will be a time in the range from about 1 minute to several days, more usually, from several minutes to about 15 days. At least several minutes are usually required, depending upon such factors as solubilities, mass transfer rates, emulsion particle size, ratio of interface surface areas to total volumes, the quantities being processed, amount of additive to be incorporated into the polymer, pressures at which the process is carried out, and agitation energy. Depending upon these same factors, times as long as several days can be necessary for achievement of complete infusion.

Additives that are useful in the practice of the invention are those which have some degree of solubility in the polymer and which have a molecular size sufficiently small to allow the additive to be absorbed into the swollen polymer. It is not necessary that the additive be soluble in the compressed fluid.

The additives which can be incorporated into polymers using the invention methods include, but are not limited to, bioactive chemicals, dyes, antioxidants, accelerators, accelerator activators, plasticizers, softeners, vulcanizing agents, extenders, tackifiers, monomers, polymerization initiators, UV stabilizers, UV sensitizers, electronic dopants, optical dopants, and mixtures thereof.

Examples of useful additives presently preferred as dyes include, but are not limited to, azo dyes, cyanine dyes, phthalocyanine pigments, nitroso dyes, nitro dyes, and triphenylmethane dyes. Presently most preferred for dyes are azobenzene dyes because of their favorable solubility in polystyrene.

Examples of useful bioactive additives include, but are not limited to, hormones, anticancer agents, local anesthetics, insulin and narcotic antagonists.

Sufficient amounts of polymer and additive are needed in the aqueous or alcohol-based dispersion medium to ensure good contact of the additive with the polymer. Generally the ratio of additive to polymer will depend upon how much additive is to be incorporated into the polymer, the desired results, and the solubility of the additive into the polymer phase relative to the solubility of the additive in the compressed fluid and aqueous or alcohol phases of the colloidal system. For example, when dyeing polystyrene with an azobenzene dye, depending upon the desired intensity of color, an amount of dye in the range from about 0.05 weight percent to about 10 weight percent based upon total weight of dye and polymer can be used.

Use of too little polymer can result in an inefficient process due to poor contact between the additive and polymer. Use of too much polymer can cause difficulties in maintaining colloidal stability during the process.

Use of too little additive can result in failure to load the polymer to the extent necessary to achieve the intended purpose. Use of too much additive can cause difficulties in separating unincorporated additive from the polymer.

Once the polymer has been contacted with the additive for a time sufficient to allow incorporation of the additive into the polymer to the extent desired, the compressed fluid is removed. The compressed fluid is removed by any suitable or convenient means. It can simply be vented from the system as the pressure is released or can be collected for re-use or recycling. Generally it is preferable to remove the compressed fluid from the system at a rate slow enough to prevent foaming or deformation of the polymer particles.

Once the compressed fluid is removed, the infused polymer in the colloidal suspension can be used in traditional colloidal processing operations with the infused polymer still in suspension. For example, the suspension may be used to form a polymer coating on a surface, or may be injected for delivery of biologically active compounds. Such a colloidal suspension can be further purified by drying and re-suspending the infused polymer in repeated steps as needed.

To obtain a dry particulate infused polymer product, the aqueous or alcohol phase can be removed from the infused polymer by any suitable drying method such as spray drying, centrifuging, freeze drying, filteration, heat evaporation or combinations thereof. The dried infused polymer may still contain excess surfactant which can be removed by washing the polymer with alcohol or water and subsequent centrifuging or filtering.

Figure 2:
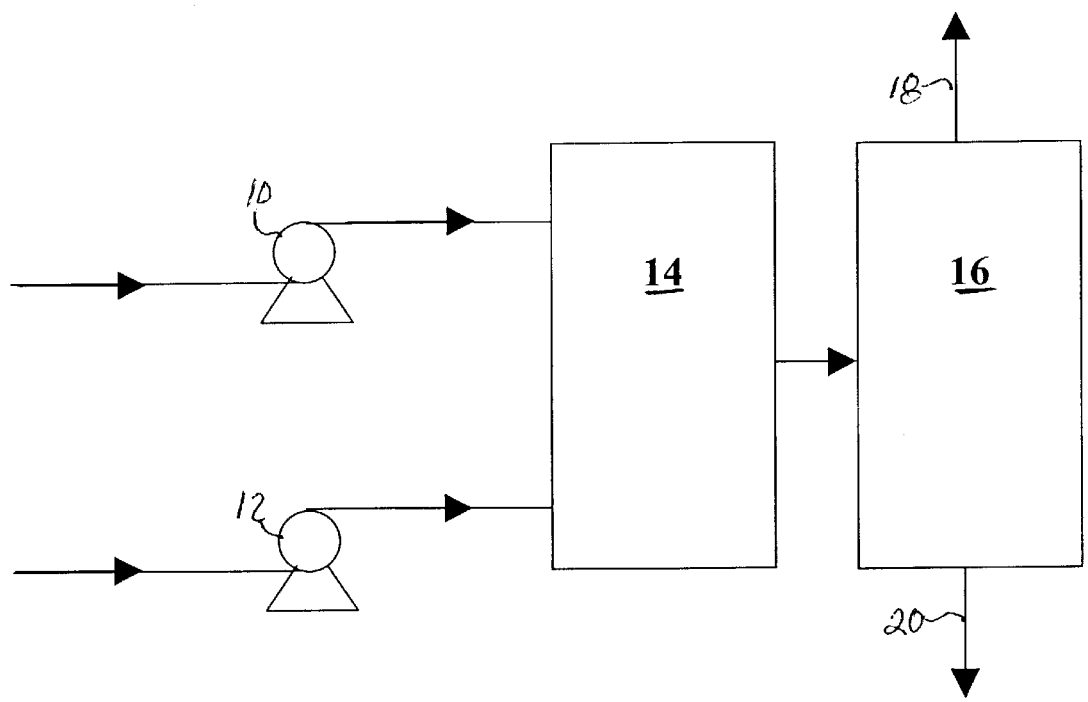
FIG. 2 is a schematic of a setup for a continuous invention process.

The invention method can be carried out as a traditional batch process in accordance with the schematic of the additions shown in FIG. 1. FIG. 2 is a schematic of how the invention method can be carried out as a continuous process. In accordance with the process shown in FIG. 2, separate pumps are used: (a) one pump 10 to deliver compressed fluid and additive; and (b) another pump 12 to deliver the colloidal system of polymer in water or alcohol and a surfactant. The components are delivered first to a continuously stirred pressurized vessel 14 where incorporation of the additive into the polymer occurs, then subsequently to a second vessel 16 having lower pressure. The second vessel 16 has a vent 18 through which the compressed fluid is vented from the reaction and another suitable opening 20 through which the product is collected.

Use of the invention method gives better control of the distribution of the additives in the polymers. By having the polymerization reactions occur separately from the additive incorporation, better control of the particle size, amount and distribution of the additives within the polymer particles can be achieved. The use of the colloidal system during incorporation of the additives into the polymer particles can be used to prevent clumping or agglomeration of the polymer particles.

The invention methods can be used to avoid use of toxic solvents.

The invention methods can be used at ambient temperatures that are significantly below temperatures normally employed when most other methods of incorporating additives into polymers are used, thereby improving the economics of incorporating additives into the polymers and avoiding undesirable heat activated degradation of the additives or polymers.

The following examples will demonstrate the operability of the invention.

EXAMPLE I

Polystyrene with poly(N-vinyl pyrrolidone) bonded thereto was polymerized for use in demonstrating the operability of the invention in Examples II and III.

A polymerization procedure similar to that described by Paine (*J. Macromolecules,* 1990, vol. 23, pp. 3104–3109) was used to synthesize polystyrene particles in ethanol.

Styrene monomer, commercially available from Acros, was used as received.

1.5 grams of poly(N-vinyl pyrrolidone), having a $M_w$=40,000 g/mol, commercially available from Acros, was put in 75 mL of reagent grade denatured ethanol. The mixture was stirred for 30 minutes to dissolve the poly(N-vinyl pyrrolidone). Helium was then bubbled through the solution for 30 minutes to remove any dissolved oxygen. The ethanol/poly(N-vinyl pyrrolidone) solution was then heated to 70° C. in an oil bath while under a helium atmosphere.

In a separate flask, 0.25 g of azoisobutyronitrile, commercially available from Aldrich, was dissolved in 25 mL of the styrene to form a styrene/azoisobutyronitrile solution.

All of the styrene/azoisobutyronitrile solution was injected into all 75 mL of the ethanol/poly(N-vinyl pyrrolidone) solution. The reaction flask became slightly turbid within 2 minutes after injecting the styrene/azoisobutyronitrile solution. Ten minutes later, the flask appeared milky white due to light scattering from nucleated polymerized styrene particles. Polymerization of the styrene was allowed to continue for 24 hours at 70° C. while stirring continuously.

Figure 3:
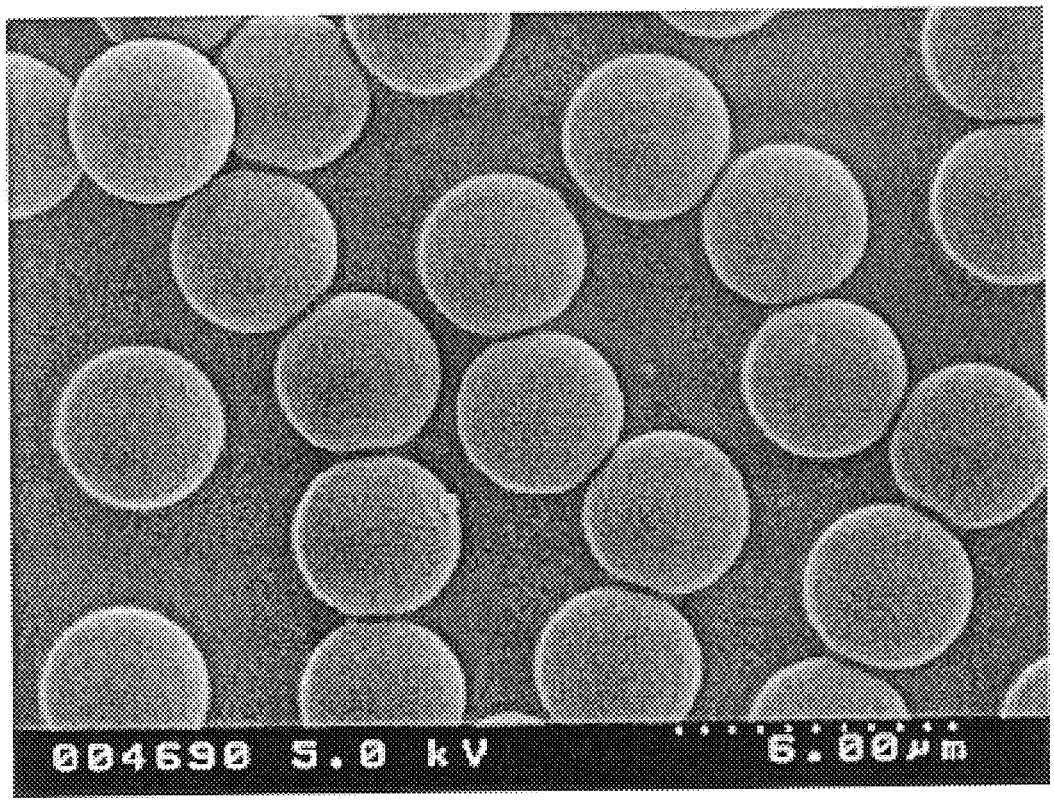
FIG. 3 is a scanning electron micrograph of the poly(N-vinyl pyrrolidone) grafted polystyrene produced in Example I.

Ethanol was removed from the particles in the flask by evaporation at room temperature for approximately 24 hours. The final product was about 20 to 25 grams of nearly monodisperse particles with an average diameter of 3.6 microns as shown in the scanning electron micrograph in FIG. 3 where the length of the dashed bar corresponds to 6.0 microns.

It is believed that the poly(N-vinyl pyrrolidone) had grafted to the styrene during the dispersion polymerization and that the particles produced had a covalently bound layer of the poly(N-vinyl pyrrolidone) at the surface.

EXAMPLE II

To demonstrate operability of the invention, polystyrene with surface grafted poly(N-vinyl pyrrolidone) obtained from the process of Example I was dyed in accordance with the invention method.

Run 1 was a control run in which no compressed fluid or emulsifier was used. Otherwise, the Run 1 was conducted in a manner identical to that of Runs 2–7.

For use in Runs 1–7, an aqueous latex (milky colloidal suspension) of the polystyrene with surface grafted poly(N-vinyl pyrrolidone) was prepared by dispersing 0.300 grams of the dried particles produced in Example I into 10 mL of deionized water by manual shaking.

Once the surface grafted polystyrene was dispersed, the aqueous colloidal system was transferred to a stainless steel variable volume view cell obtained from SC Machining, Lago Vista, Tex. Then 0.050 gram of Sudan Red™ 7B dye, commercially available from Aldrich, was added. Sudan Red™ 7B is an azobenzene dye also referred to as Solvent Red™ 19 and Fat Red™ 7B.

In Runs 2 and 5 no emulsifier was used.

In Runs 3 and 6, 0.095 grams of poly(ethylene oxide)-block-poly(butylene oxide) (PEO-b-PBO), commercially available from BASF as SAM™ 185, was used as a surfactant.

In Runs 4 and 7 perfluoropolyether carboxylic acid (PFPE—COOH, $M_w$=655 g mol$^{-1}$), commercially available from Ausimont, was used to produce an ammonium carboxylate for use as a surfactant. The PFPE—COOH was converted to an ammonium carboxylate (PFPE—COO—NH$_4$) by adding ammonium hydroxide, then subjecting the mixture to a vacuum in accordance with the procedure described in Zielinski et al., *Langmuir,* 1997, vol. 13, pp. 3934–3937. Then 0.095 gram of the perfluoropolyether ammonium carboxylate (PFPE—COO—NH$_4$) was combined with the additive before introduction into the variable volume cell.

In each of Runs 5–7, 100 $\mu$L of acetone was added to the aqueous colloidal system prior to contact with compressed carbon dioxide in an attempt to increase dye solubility in the aqueous phase.

In Runs 2–7, the variable volume cell was sealed and 3.5 grams of carbon dioxide was introduced over a period of approximately 2 minutes. The variable volume cell in each of all seven runs was then pressurized to 310 bar at 25° C. by compressing with a movable piston inside the variable volume cell over a period of approximately 2 minutes. In Runs 2–7, the carbon dioxide was liquified as the pressure was increased.

A magnetically coupled stirring bar was used to emulsify the aqueous colloidal system with the carbon dioxide. After the emulsion was stirred vigorously for 24 hours at 310 bar and 25° C., the compressed carbon dioxide was released over a period of one hour.

The remaining mixture was centrifuged for approximately 1 hour at 7500 rpm. The liquid phase was decanted from the centrifuged mixture. The solid particles were re-suspended in 50 mL of ethanol, then centrifuged, and the liquid poured off. This ethanol washing step was repeated four times until the ethanol came off clear, meaning that only dye incorporated into the polymer remained.

The amount of dye incorporated into the polymer particles was determined with UV-vis spectroscopy. The particles were dissolved in dichloromethane for examination. The extinction coefficient of the Sudan Red™ 7B in dichloromethane was determined using a series of solutions of known concentration. Sudan Red™ 7B has a peak absorbance at approximately 538 nm in dichloromethane while the polystyrene had no absorbance near this wavelength. The absorbance at the peak around 538 nm was used to calculate the concentration of dye in the particles.

Table 1 shows the colors that were achieved in each of the runs as well as the weight percent of dye incorporated as determined with UV-vis spectroscopy.

TABLE 1

| Run | Surfactant | Acetone, μL | Dye, %* | Resulting Color |
|---|---|---|---|---|
| 1** | none | 0 | 0 | white |
| 2 | none | 0 | 0.05 | light pink |
| 3 | PEO-b-PBO | 0 | 0.17 | red |
| 4 | PFPE-NH$_4$ | 100 | 0.46 | red |
| 5 | none | 100 | 0.04 | light pink |
| 6 | PEO-b-PBO | 100 | 0.15 | red |
| 7 | PFPE-NH$_4$ | 100 | 0.40 | red |

*Based on total weight % of dye and polymer.
**No compressed fluid was used in Run 1. Each of the other runs were assisted by carbon dioxide pressurization.

EXAMPLE III

As a further demonstration of operability of the invention, polystyrene particles with surface grafted poly(N-vinyl pyrrolidone) obtained from the process of Example I were infused with progesterone in accordance with the invention method.

An aqueous polystyrene colloidal system was formed by dispersing 0.337 g of the dried polystyrene particles produced in Example I into 10 mL of deionized water by manual shaking. Once the particles were dispersed, the aqueous colloidal system was transferred to a stainless steel variable volume cell obtained from SC Machining, Lago Vista, Tex. Then 0.150 g of progesterone, commercially available from Sigma, and 0.092 g of SAM™ 185, commercially available from BASF, were added to the aqueous colloidal system.

The variable volume view cell was then sealed and 3.5 g of gaseous carbon dioxide was added using a computer controlled syringe pump (ISCO™ Model 100 DX). The variable volume view cell was pressurized to 310 bar at 25° C. and a magnetically coupled stirring bar was used emulsify the aqueous colloidal system with the liquid carbon dioxide.

To incorporate the progesterone into the polystyrene, the emulsion was stirred vigorously for 24 hours at 310 bar and 25° C. Carbon dioxide was then removed by slowly venting it over the course of about an hour.

After incorporation of the progesterone into the polystyrene, the aqueous colloidal system was transferred to a 50 mL centrifuge tube and centrifuged at 7500 rpm for 20 minutes. The aqueous layer was then decanted, leaving the infused polystyrene particles. The polystyrene particles were then re-suspended in 50 mL of ethanol to wash off progesterone that was not incorporated into the polymer particles. The alcohol suspension was then centrifuged at 7500 rpm for 20 minutes and the ethanol layer was decanted, leaving the washed, infused styrene particles. The infused polystyrene particles were dried in air overnight at ambient temperature and pressure in a fume hood.

The amount of progesterone incorporated into the polystyrene particles was determined by nuclear magnetic resonance spectroscopy (NMR). A fraction of the dried particles was dissolved in deuterated methylene chloride and the NMR spectrum was taken. The NMR spectrum of progesterone displays three strong singlet peaks at 4.057, 3.155 and 2.615. The NMR spectrum of polystyrene displays three strong singlet peaks at 7.298, 3.507 and 3.234.

The measured NMR spectrum of the infused polystyrene particles obtained in the process of this example displayed all six singlet peaks described above, confirming the loading of progesterone into the polystyrene particles. The concentration of progesterone was determined by integration of the NMR peak heights with the following calculation:

$$\left(\frac{\overline{A}_{PS}}{\overline{A}_{PG}}\right) \times \left(\frac{P_{PS}}{P_{PG}}\right) \times \left(\frac{MW_{PS}}{MW_{PG}}\right) = \text{Additive Loading, wt \%}$$

$$\frac{1.7}{67.74} \times \frac{5}{3} \times \frac{314.45}{104.14} = 12.6 \text{ weight percent}$$

where $\overline{A}_{PG}$=average integrated peak area for the three progesterone peaks (1.7), $\overline{A}_{PS}$=integrated peak area for the aromatic protons in polystyrene (67.74), $P_{PS}$=number of aromatic protons in the polystyrene peak (5), $P_{PG}$=number of protons in the progesterone peaks (3), $MW_{PG}$=molecular weight of progesterone (314.45), and $MW_{PS}$=molecular weight of the styrene repeat unit in polystyrene (104.14).

This calculation gives a progesterone loading of the polystyrene particles of 12.6 percent by weight, based upon total weight of progesterone and polystyrene.

While the compositions, processes and articles of manufacture of this invention have been described in detail for the purpose of illustration, the inventive compositions, processes and articles are not to be construed as limited thereby. This patent is intended to cover all changes and modifications within the spirit and scope thereof.

Industrial Appplicability

The invention process can be used, for example, to add a colorant to a polymer or to add a biocide, insect repellant, medication or other additives to a polymer for subsequent timed release, or to introduce monomer and a polymerization initiator into a polymer for subsequent polymerization.

What is claimed is:

1. A process for incorporating additives into polymers comprising:
    (a) forming a colloidal system of a polymer;
    (b) emulsifying said colloidal system with a compressed fluid; and
    (c) contacting said polymer in said colloidal system with an additive in the presence of said compressed fluid, wherein said colloidal system is alcohol based.

2. The process recited in claim 1 wherein said compressed fluid is at a pressure in the range from about 100 bar to about 10,000 bar during step (c).

3. The process recited in claim 1 wherein said polymer in said colloidal system is contacted with said additive in the presence of said compressed fluid for a period of time in the range from about 1 minute to about 15 days.

4. The process recited in claim 1 wherein said additive is combined with said compressed fluid prior to introduction of said compressed fluid into said colloidal system.

5. The process recited in claim 1 wherein said additive is introduced into said colloidal system before introduction of said compressed fluid into said colloidal system.

6. The process recited in claim 1 wherein said additive is introduced into said colloidal system after introduction of said compressed fluid into said colloidal system.

7. The process recited in claim 1 wherein said polymer further comprises a colloidal stabilizer to stabilize suspension of said polymer in said colloidal system.

8. The process recited in claim 7 wherein said colloidal stabilizer is one selected from the group of sulfates, amines, carboxylates, and mixtures thereof.

9. The process recited in claim 7 wherein said colloidal stabilizer is one selected from the group of poly(ethylene oxide), poly(N-vinyl pyrrolidone), poly(sodium 4-styrene sulfonate), poly(acrylic acid), poly(diallyldimethylammonium chloride), and copolymers and mixtures thereof.

10. The process recited in claim 1 further comprising introducing a surfactant into said colloidal system during emulsification.

11. The process recited in claim 1 wherein said polymer is in particulate form.

12. The process recited in claim 11 wherein said polymer particles are in the range from about 10 nanometers to about 500 microns.

13. The process recited in claim 1 wherein said polymer is one selected from the group of polystyrene, poly(lactide-co-glycolide), poly(lactic acid), poly(glycolic acid), poly(caprolactone), polyanhydrides, cellulose, natural rubbers, polyisoprene, styrene-butadiene polymers, butyl rubbers, chloroprene polymers, polyamides, polyimides, polyesters, nitrile rubbers, polyacrylic polymers, vinyl chloride polymers, vinylidene chloride polymers, polycarbonate polymers, polyurethane polymers, polyacrylates, polymethacrylates, polyacetylenes, and copolymers and mixtures thereof.

14. The process recited in claim 13 wherein said polymer is polystyrene.

15. The process recited in claim 13 wherein said polymer poly(lactide-co-glycolide).

16. The process recited in claim 13 wherein said polymer is poly(caprolactone).

17. The process recited in claim 1 wherein said compressed fluid is one selected from the group of carbon dioxide, ethylene, ethane, propane, nitrous oxide, monochlorotrifluoromethane, acetylene, phosphine, phosphonium chloride, methyl fluoride, methane, fluoroform, sulphur dioxide and mixtures thereof.

18. The process recited in claim 17 wherein said compressed fluid is carbon dioxide.

19. The process recited in claim 1 wherein said compressed fluid is normally gaseous at atmospheric pressure and room temperature and has a density at the processing pressure of at least 0.01 gram per cubic centimeter.

20. The process recited in claim 1 wherein said additive is one selected from the group of bioactive chemicals, dyes, antioxidants, accelerators, accelerator activators, plasticizers, softeners, vulcanizing agents, extenders, tackifers, monomers, polymerization initiators, UV stabilizers, UV sensitizers, electronic dopants, optical dopants, and mixtures thereof.

21. The process recited in claim 20 wherein said additive is a dye selected from the group of azo dyes, cyanine dyes, phthalocyanine pigments, nitroso dyes, nitro dyes, triphenylmethane dyes and mixtures thereof.

22. The process recited in claim 21 wherein said dye is present in an amount in the range from about 0.05 weight percent to about 10 weight percent, based upon total weight of dye and polymer.

23. The process recited in claim 20 wherein said additive is an azobenzene dye.

24. The process recited in claim 1 wherein said additive is a bioactive agent.

25. The process recited in claim 1 wherein said additive is progesterone.

26. The process recited in claim 7 wherein said colloidal stabilizer is one selected from the group of sulfates, amines, carboxylates, surfactants which are soluble in the colloidal system and mixtures thereof.

27. The process recited in claim 7 wherein said colloidal stabilizer is poly(ethylene oxide), poly(N-vinyl pyrrolidone), poly(sodium 4-styrene sulfonate), poly(acrylic acid), poly(diallyldimethylammonium chloride), and copolymers and mixtures thereof.

28. The process recited in claim 7 wherein said colloidal stabilizer is poly(N-vinyl pyrrolidone).

29. The process recited in claim 10 wherein said surfactant is non-toxic to humans.

30. The process recited in claim 10 wherein said surfactant is present in an amount in the range from about 0.001 to about 10 weight percent, based on total weight of said colloidal system.

31. The process recited in claim 10 wherein said surfactant is one selected from the group of sorbitan esters, sucrose esters, alkyl polyglucosides, alkyl oligosaccharides, polyoxyethylene-polypropylene block and graft copolymers, polyoxyethylene-polybutylene block and graft copolymers, perfluoropolyether ammonium carboxylate, sulfated fats and oils, sulfated monoglycerides, alkyl betaines, alkyl aminopropionates, alkyl iminodipropionates, alkyl imidazoline derivatives, alkyl pyridinium salts, alkyl trimethylammonium salts, alkyl ammonium salts, alkyl amines, alkyl phosphate salts, olefin sulfonates, alkylaryl sulfonates, sulfated alkanolamides, alkyl sulfate salts and mixtures thereof.

32. The process recited in claim 31 wherein said surfactant is perfluoropolyether ammonium carboxylate.

33. The process recited in claim 31 wherein said surfactant is polysorbate.

34. The process recited in claim 31 wherein said surfactant is sodium oleate.

35. The process recited in claim 1 wherein step (c) is carried out at a temperature at least as low as the critical temperature of said compressed fluid and at a pressure that is at least 10% of the saturated vapor pressure of said compressed fluid.

36. The process recited in claim 1 wherein step (c) is carried out at a temperature above the critical temperature of said compressed fluid and at a pressure 0.5 to 5 times the critical temperature of said compressed fluid.

37. The process recited in claim 1 further comprising venting said compressed fluid from said colloidal system after contacting said polymer with said additive.

38. The process recited in claim 1 further comprising removing liquid dispersion phase from said colloidal system to obtain a polymer product with at least a portion of said additive incorporated therein.

39. The process recited in claim 1 wherein said process is carried out as a batch process.

40. The process recited in claim 1 wherein said process is carried out as a continuous process.

* * * * *